(12) United States Patent
Schmidt et al.

(10) Patent No.: US 8,920,669 B2
(45) Date of Patent: Dec. 30, 2014

(54) ELECTROLYTE SYSTEM

(75) Inventors: Michael Schmidt, Seeheim-Jugenheim (DE); Guenter Semrau, Kefenrod (DE)

(73) Assignee: Merck Patent GmbH, Darmstadt (DE)

( * ) Notice: Subject to any disclaimer, the term of this patent is extended or adjusted under 35 U.S.C. 154(b) by 184 days.

(21) Appl. No.: 13/388,454

(22) PCT Filed: Jul. 6, 2010

(86) PCT No.: PCT/EP2010/004117
§ 371 (c)(1),
(2), (4) Date: Feb. 2, 2012

(87) PCT Pub. No.: WO2011/015264
PCT Pub. Date: Feb. 10, 2011

(65) Prior Publication Data
US 2012/0127631 A1 May 24, 2012

Related U.S. Application Data (60) Provisional application No. 61/230,873, filed on Aug. 3, 2009.

(51) Int. Cl.
| | | |
|---|---|---|
| H01G 9/022 | (2006.01) | |
| H01G 9/035 | (2006.01) | |
| H01M 10/0568 | (2010.01) | |
| H01G 11/62 | (2013.01) | |
| H01M 10/0569 | (2010.01) | |

(52) U.S. Cl.
CPC .............. *H01G 9/022* (2013.01); *H01G 9/035* (2013.01); *H01G 9/038* (2013.01); *H01G 11/62* (2013.01); *H01M 10/0568* (2013.01); *H01M 10/0569* (2013.01); *H01M 2300/0025* (2013.01); *Y02E 60/13* (2013.01)
USPC .......... 252/62.2; 361/504; 361/505; 361/502; 136/263

(58) Field of Classification Search
USPC .......... 252/62.2; 361/504, 505, 502; 136/263; 429/188, 326–339
See application file for complete search history.

(56) References Cited

U.S. PATENT DOCUMENTS

| | | | |
|---|---|---|---|
| 6,414,837 B1 | 7/2002 | Sato et al. | |
| 6,423,454 B1 | 7/2002 | Heider et al. | |
| 6,535,373 B1 * | 3/2003 | Smith et al. | 361/504 |
| 6,911,281 B2 | 6/2005 | Sonoda et al. | |
| 7,247,404 B2 * | 7/2007 | Jung et al. | 429/199 |
| 2002/0028389 A1 | 3/2002 | Sonoda et al. | |
| 2002/0160261 A1 | 10/2002 | Schmidt et al. | |

(Continued)

FOREIGN PATENT DOCUMENTS

| | | |
|---|---|---|
| CA | 2 328 020 A1 | 6/2001 |
| EP | 1 106 617 A2 | 6/2001 |

(Continued)

OTHER PUBLICATIONS

Derwent abstract 2008-D46966, abstract for KR 706715, Apr. 2007.*

(Continued)

*Primary Examiner* — Carol M Koslow
(74) *Attorney, Agent, or Firm* — Millen, White, Zelano & Branigan, P.C.

(57) ABSTRACT

The present invention relates to electrolyte systems and electrochemical cells comprising conductive salts having different anionic and/or cationic radii.

3 Claims, 3 Drawing Sheets

(56) References Cited

U.S. PATENT DOCUMENTS

| | | |
|---|---|---|
| 2006/0068282 A1* | 3/2006 | Kishi et al. .................. 429/188 |
| 2007/0042271 A1* | 2/2007 | Nishida et al. ............... 429/306 |
| 2009/0130565 A1* | 5/2009 | Matsui et al. ................ 429/326 |

FOREIGN PATENT DOCUMENTS

| | | | |
|---|---|---|---|
| EP | 1 127 888 A1 | | 8/2001 |
| EP | 1 174 941 A2 | | 1/2002 |
| EP | 1 229 038 A1 | | 8/2002 |
| JP | 10-270079 | * | 10/1998 |
| JP | 10-270079 A | | 10/1998 |
| JP | 2002-334815 A | | 11/2002 |
| JP | 2005-135777 | * | 5/2005 |
| JP | 2007227940 | | 9/2007 |
| JP | 2007-280948 | * | 10/2007 |
| JP | 2010-34301 A | | 2/2010 |
| WO | WO 2007-010833 | * | 2/2007 |

OTHER PUBLICATIONS

International Search Report, dated Nov. 2, 2010, issued in corresponding PCT/EP2010/004117.

English Abstract of Japanese Publication No. 2007227940. Publication Date: Sep. 6, 2007. Inventor: Satou Takaya et al. "Electrolytic Solution for Storage Device, and Electric Double Layer Capacitor". Applicant: Nisshin Spinning. JP Application No. 20070061158 20073012. Obtained from Espacenet.com. (6 pages).

English Translation of Office Action in corresponding Japanese Patent Application No. 2012-523212. Dispatch Date: Jul. 22, 2014. (3 pages).

* cited by examiner

ELECTROLYTE SYSTEM

This is a national phase application of international application PCT/EP2010/004117, filed Jul. 6, 2010, which claims the benefit of the filing date of U.S. Provisional Application Ser. No. 61/230,873 filed Aug. 3, 2009, both of which are incorporated by reference herein.

FIELD OF THE INVENTION

The present invention relates to electrolyte systems and electrochemical cells comprising conductive salts having different anionic and/or cationic radii.

BACKGROUND OF THE INVENTION

Electrochemical double layer capacitors, also super- or ultracaps, use high porous electrodes, usually based on activated carbon. The partitioning of pore sizes into small, medium-sized, and large pores depends on the electrode material used and on the preparation of the electrodes (The Ultracapacitor Opportunity Report, Menahem Anderman, Advanced Automotive Batteries, 2005). The electrodes are separated by a so called separator, usually consisting of polypropylene or polyethylene. Paper or ceramic membranes may also be used. The electrolyte, which is mostly based on organic solvents, is placed between the electrodes, partially sucked by the separator and the electrodes. The electrolyte is the ionic conductive connection between the electrodes and it penetrates in between the single electrode particles.

Typical electrolyte systems used in today's supercapacitors are solutions of $N(C_2H_5)_4BF_4$ or $N(CH_3)(C_2H_5)_3BF_4$ dissolved in acetonitrile or ethyl-methyl-imidazolium$BF_4$ in propylene carbonate. Owing to the extraordinary combination of low viscosity and high dipole moment of acetonitrile, these electrolytes have a very high conductivity. A typical electrolyte of 1.0 mol/l $N(C_2H_5)_4BF_4$ in acetonitrile shows an ion conductivity of almost 60 mS/cm at 25° C. Additionally, such electrolytes based on acetonitrile show superior characteristics at low temperatures and an acceptable voltage. Present capacitors are charged up to 2.5 V, partially up to 2.7 V.

Compared to modern lithium ion batteries, double layer capacitors can only accumulate a fractional part of energy. But they are capable of high current rates and they can be charged and discharged completely within seconds. Supercaps show additional advantages with regard to stability of life cycles (up to 1 million charge/discharge cycles compared to some hundred cycles for lithium ion batteries) and hence they seem to be interesting energy storage systems for a variety of stationary and mobile applications. Solely, their relative low energy density is regarded to be obstructive.

SUMMARY OF THE INVENTION

It has now been found that electrolyte systems comprising conductive salts having different anionic and/or cationic radii provide superior electrochemical cells especially double layer capacitors and hybrid capacitors, showing enhanced properties. For example the electrolyte systems of the invention show high electrochemical stability. Additionally, the invention provides electrolyte systems suitable for charging voltages of more than 3.0 V. A main advantage of electrolyte systems of the invention is a higher energy density compared to state of the art materials. Thus, the energy density of commercial double layer capacitors, which show an energy density of 2.5-4.0 Wh/kg when run with electrolyte systems of the state of the art, is enhanced to 4 or even up to nearly 6 Wh/kg when run with an electrolyte system of the invention.

Preferably, electrolyte systems of the invention comprise conductive salts having different anionic and cationic radii. According to the invention and throughout the specification, ion radius (anionic and/or cationic radius) always mean the ion radius of the unsolvated ion. Preferred electrolyte systems of the invention comprise at least three conductive salts having different anionic and/or cationic radii. Electrolyte systems comprising at least three conductive salts having different anionic and cationic radii are especially preferred. In preferred embodiments of the invention the electrolyte system comprises exactly three or four conductive salts having different anionic and/or cationic radii.

A preferred embodiment of the invention is an electrolyte system comprising in each case at least one conductive salt selected from at least two of the Groups I-III, wherein Group I comprises conductive salts having an anion with a radius of <0.4 nm and a cation with a radius of <0.1 nm, Group II comprises conductive salts having an anion with a radius of <0.4 nm and a cation with a radius of 0.1 nm or 0.4 nm, and Group III comprises conductive salts having an anion with a radius of >0.4 nm and a cation with a radius of >0.3 nm.

Suitable conductive salts according to Group I have an anion with a radius of <0.4 nm, preferably of 0.2 nm, and a cation with a radius of <0.1 nm, preferably of 0.08 nm. Preferred compounds of Group I are: $LiBF_4$, $LiPF_6$, $LiOSO_2CF_3$, $LiN(SO_2CF_3)_2$ or $LiN(SO_2C_2F_5)_2$. Especially preferred are: $LiBF_4$ or $LiPF_6$.

Other suitable conductive salts according to Group II have an anion with a radius of <0.4 nm, preferably of 0.2-0.25 nm, and a cation with a radius of 0.1 nm or 0.4 nm, preferably of 0.35 nm.

Preferred compounds of Group II comprise an anion selected from: $[BF_4]^-$, $[PF_6]^-$, $[OCOR_1]^-$, $[OSO_2R_1]^-$, or $[N(SO_2R_1)(SO_2R_2)]^-$, wherein $R_1$ and $R_2$ are independently of one another $CH_3$, $C_2H_5$, $CF_3$, or $C_2F_5$. Preferably $R_1$ and $R_2$ are identical. Especially preferred are: $[BF_4]^-$, $[PF_6]^-$, and $[N(SO_2CF_3)_2]^-$.

Also preferred are compounds of Group II comprising a cation selected from $[NR_3R_4R_5R_6]^+$, $[PR_3R_4R_5R_6]^+$, where $R_3$-$R_6$ are independently of one another $CH_3$ or $C_2H_5$, and wherein single $CH_2$-groups of the aliphatic rings may be substituted by O, S or $NR_7$ with $R_7$=alkyl. Preferably $R_3$-$R_6$ are identical. Especially preferred cations are: $[N(CH_3)_4]^+$, $[P(CH_3)_4]^+$, $[N(C_2H_5)_4]^+$, $[P(C_2H_5)_4]^+$, $[N(CH_3)(C_2H_5)_3]^+$, $[N(CH_3)_2(C_2H_5)(CH_2CH_2OCH_3)]^+$, $[P(CH_3)(C_2H_5)_3]^+$, $[P(CH_3)_2(C_2H_5)(CH_2CH_2OCH_3)]^+$, ethyl-methyl-imidazolium, N-ethyl-N-methylpyrrolidinium, N-ethyl-N-methylpiperidinium and N-(methoxyethyl)-N-methylmorpholinium.

Preferably, the following combinations of anions and cations are used for compounds of Group II: $N(CH_3)_4BF_4$, $N(C_2H_5)_4BF_4$, $N(CH_3)_2(C_2H_5)(CH_2CH_2OCH_3)BF_4$, methyl-imidazolium$BF_4$, N-ethyl-N-methylpyrrolidinium$BF_4$, N-ethyl-N-methylpiperidinium$BF_4$, $N(CH_3)_4PF_6$, $N(C_2H_5)_4PF_6$, $N(CH_3)_2(C_2H_5)(CH_2CH_2OCH_3)PF_6$, methylimidazolium$PF_6$, N-ethyl-N-methylpyrrolidinium$PF_6$, N-ethyl-N-methylpiperidinium$PF_6$.

Other suitable conductive salts according to Group III have an anion with a radius of >0.4 nm, preferably 0.5 nm, and a cation with a radius of >0.3 nm, preferably 0.4 nm.

Preferred compounds of Group III salts comprise an anion selected from $[PF_xR_{6-x}]^-$ with $1 \leq x \leq 5$ and $R=CF_3$, $C_2F_5$, $C_3F_7$, $C_4F_9$, $C_5F_{11}$, or $C_6F_{13}$, $[OCOR_8]^-$, $[OSO_2R_8]^-$, $[N(SO_2R_8)(SO_2R_9)]^-$, where $R_8$ and $R_9$ are independently of one another an alkyl group with $\geq 1$ carbon atom which may be partially or totally fluorinated. Preferably $R_8$ and $R_9$ are identical. Especially preferred anions are: $[(C_2F_5)_3PF_3]^-$, $[N(SO_2C_2F_5)_2]^-$.

Also preferred are compounds of Group III comprising a cation selected from $[NR_{10}R_{11}R_{12}R_{13}]^+$, $[PR_{10}R_{11}R_{12}R_{13}]^+$, where $R_{10}$-$R_{13}$ are independently of one another an alkyl group with $\geq 1$ carbon atom and at least one $R_{10}$-$R_{13}$ being at least $C_2$ alkyl, and wherein single $CH_2$-groups of $R_{10}$-$R_{13}$ may be substituted by hetero atoms, preferably by O, S or $NR_7$ with $R_7$=alkyl. Preferably $R_{10}$-$R_{13}$ are identical. $R_{10}$-$R_{13}$ are preferably $C_3H_7$, $C_4H_9$, $C_6H_{13}$ or $C_8H_{17}$. Especially preferred cations are:

Tetrabutylammonium, trihexyl(tetradecyl)phosphonium, 1-hexyl-3-methylimidazolium, butyl-imidazolium, N-butyl-N-methylpyrrolidinium, N-butyl-N-methylpiperidinium. N-(2-methoxyethyl)-N-methyl-pyrrolidinium and N-(2-methoxyethyl)-N-methylpiperidinium.

In a preferred embodiment of the invention the conductive salts are solved in at least one aprotic solvent. Suitable solvents are nitriles, carboxylic acid esters, carbonates, ethers or mixtures of these. Preferred solvents are acetonitrile, adipinodinitrile, ethyl acetate, methyl propionate, γ-butyrolactone, dimethyl carbonate, diethyl carbonate, ethyl methyl carbonate, ethylene carbonate, propylene carbonate, tetrahydrofuran, 2-methyl-tetrahydrofuran, dioxane, dioxolane or mixtures of these. Especially preferred are acetonitrile, dimethyl carbonate, propylene carbonate, γ-butyrolactone and mixtures thereof.

In one embodiment of the invention the total amount of conductive salts is from 0.2-4 mol/l, preferably from 0.3-3 mol/l, especially preferred from 0.5-1.5 mol/l.

The electrolyte of the invention may comprise usual additives, such as those typically used in lithium ion batteries, e.g. vinylene carbonate, etc.

Other embodiments of the invention are an electrochemical cell, a double layer capacitor, and a hybrid capacitor, all filled with an electrolyte system of the invention and showing higher energy density than state of the art materials. Electrochemical cells, double layer capacitors, and hybrid capacitors are known to the person skilled in the art (see for example The Ultracapacitor Opportunity Report, Menahem Anderman, Advanced Automotive Batteries, 2005).

In a further embodiment the invention concerns a process for optimization of an electrolyte system, based on statistical experimental design with inner loss resistance ESR (Equivalent Series Resistance $R_{ESR}$) measured in Ohm, energy density measured in Wh/kg, and power density measured in W/kg as target figures.

A further embodiment of the invention is an use of an electrolyte system according to the claims for electrochemical and electro-optical cells such as batteries, capacitors or dye-sensitized solar cells.

The conductive salts essential for the invention are either known and commercially available (e.g. $LiPF_6$, and $N(C_2H_5)_4$ $BF_4$ are commercially available from Morita, Stella Hashimoto and/or Honeywell, a variety of the onium salts used in the examples are commercially available from Merck KGaA) or can be synthesised by methods known to the person skilled in the art. The synthesis of selected $(C_2F_5)_3$ $PF_3$-based ionic liquids is described in EP 1 162 204 A1 and EP 1178050 A2.

The entire disclosure of all applications, patents and publications, cited above are hereby incorporated by reference. From the foregoing description, one skilled in the art can easily ascertain the essential characteristics of this invention, and without departing from the spirit and scope thereof, can make various changes and modifications of the invention to adapt it to various usages and conditions.

The following examples illustrate the invention without restricting it. The examples can be repeated with similar success by substituting the generically or specifically described reactants and/or operating conditions of this invention for those used in the examples.

EXPERIMENTAL

Comparative Example

A) Conductivity

Table 1 shows the conductivity of $N(C_2H_5)BF_4$ (in the following and in the figures also named $TEABF_4$, Honeywell) in acetonitrile (0.9 M).

TABLE 1

| temperature [° C.] | conductivity [mS/cm] |
|---|---|
| +25 | 52.8 |
| +5 | 43.6 |
| −15 | 34.1 |
| −25 | 29.5 |
| −35 | 25.0 |
| −45 | 20.4 |

B) Electrochemical Stability/CV Measurement

Figure 1:
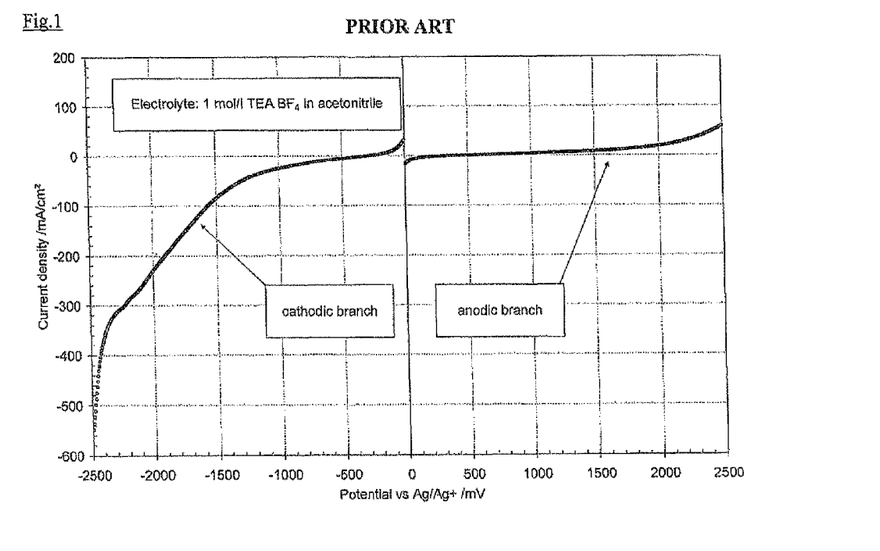
FIG. 1 shows the results of a cyclovoltage measurement in a three electrodes measurement setup using a prior art electrolyte.

FIG. 1 shows the results of a cyclovoltage measurement in a three electrodes measurement setup with glassy carbon working electrode, platinum counter electrode and Ag/Ag+ reference electrode. Two cyclovoltammetric measurements (CVs) are conducted with 5 cycles each and at a scan speed of 10 mV/s. CV1 starts at 0 V versus the reference in negative polarisation direction at a scan speed of 10 mV/s. A final potential of −2500 mV versus Ag/Ag+ is chosen. CV2 starts at 0 V versus the reference in positive polarisation direction at a scan speed of 10 mV/s. A final potential of +2500 mV versus Ag/Ag+ is chosen. A 1 M solution of $N(C_2H_5)BF_4$ in acetonitrile is used as electrolyte. FIG. 1 shows in each case the first branch of the third cycle.

C) ESR Progression

Figure 2:
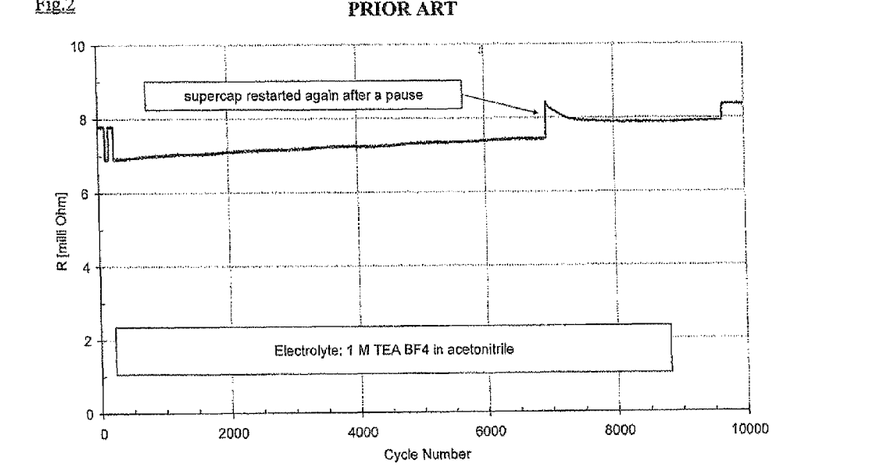
FIG. 2 shows the progression of the inner loss resistance ESR (Equivalent Series Resistance $R_{ESR}$) of a commercial double layer capacitor using a prior art electrolyte.

FIG. 2 shows the progression of the inner loss resistance ESR (Equivalent Series Resistance $R_{ESR}$) of a commercial double layer capacitor with a rated capacity of 110 F. A 1M solution of $N(C_2H_5)BF_4$ (Table 3, Group q)) in acetonitrile is used as electrolyte. Charging potential is 2.7 V.

Example 1

Tables 2 and 3 show examples of electrolyte systems of the invention and their conductivity measured at 20° C. In each case the total concentration of salts is 1 mol/l in acetonitrile. All electrolytes measured have a water value (measured by Karl-Fischer-titration) below 10 ppm.

TABLE 2

| Group | $N(C_2H_5)_4BF_4$ (Honeywell) mol-% | LiPF$_6$ (Morita) mol-% | MOEMPL NTF (Merck KGaA) mol-% | PH$_3$T FAP (Merck KGaA) mol-% | conductivity (20°) [mS/cm] |
|---|---|---|---|---|---|
| a) | | | 100 | | 39.2 |
| b) | 20 | | 80 | | 39.6 |
| c) | | 50 | 50 | | 39.3 |
| d) | 20 | 50 | 30 | | 37.3 |
| e) | | | 80 | 20 | 27.5 |
| f) | 20 | | 60 | 20 | 28.5 |
| g) | | 50 | 30 | 20 | 29.4 |
| h) | 20 | 50 | 10 | 20 | 26.4 |
| i) | 10 | 25 | 55 | 10 | 31.6 |
| j) | 1.5 | 25 | 63.5 | 10 | 32.3 |
| k) | 18.5 | 25 | 46.5 | 10 | 32.9 |
| l) | 10 | 3.75 | 76.25 | 10 | 33.2 |
| m) | 10 | 46.25 | 33.75 | 10 | 32.3 |
| n) | 10 | 25 | 63.5 | 1.5 | 33.6 |
| o) | 10 | 25 | 46.5 | 18.5 | 27.8 |

TABLE 3

| Group | $N(C_2H_5)_4$ BF4 mol-% | LiPF$_6$ mol-% | MOEMPL FAP mol-% | PH$_3$T FAP mol-% | conductivity (20°) [mS/cm] |
|---|---|---|---|---|---|
| a) | 31.7 | 31.7 | 31.7 | 5 | 35.8 |
| b) | 30 | 30 | 36.7 | 3.3 | 37.9 |
| c) | 35 | 28.3 | 28.3 | 8.3 | 35.7 |
| d) | 35 | 35 | 28.3 | 1.7 | 38.7 |
| e) | 33.3 | 33.3 | 33.3 | — | 40.2 |
| f) | 26.7 | 33.3 | 33. | 6.7 | 36.4 |
| g) | 33.3 | 26.7 | 33.3 | 6.7 | 36.6 |
| h) | 28.3 | 35 | 28.3 | 8.3 | 35.3 |
| i) | — | 100 | — | — | 42.1 |
| j) | 90 | — | — | 10 | 38.1 |
| k) | — | 95 | — | 5 | 42.3 |
| l) | 95 | — | — | 5 | 43.5 |
| m) | 50 | 50 | — | — | 38.2 |
| n) | 45 | 45 | — | 10 | 17.5 |
| o) | 47.5 | 47.5 | — | 5 | 30.5 |
| p) | 100 | — | — | — | 55.4 | with
MOEMPL NTF:

$N(SO_2CF_3)_2$—

MOEMPL FAP:

$(C_2F_5)_3PF_3$—

PH3T FAP:

$(C_2F_5)_3PF_3$—

Example 2

Electrochemical Stability/CV Measurement

Figure 3:
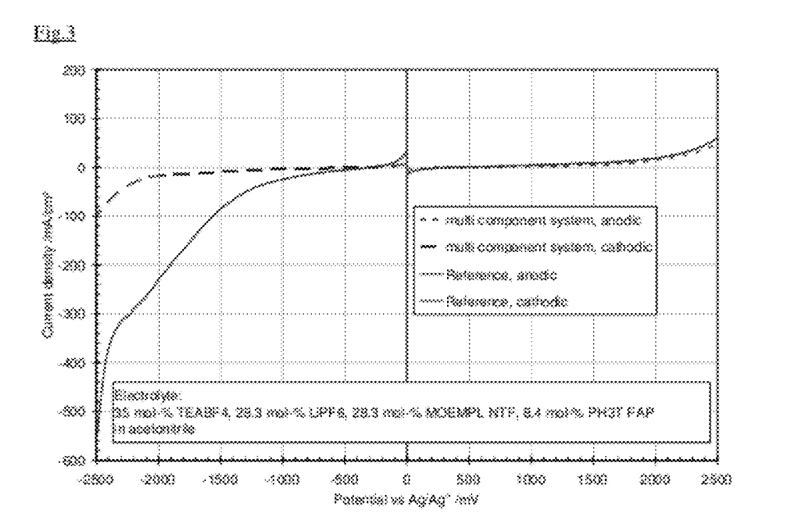
FIG. 3 shows the results of a cyclovoltammogram measurement in a three electrodes measurement setup using an electrolyte according to the invention.

FIG. 3 shows the results of a cyclovoltammogram measurement in a three electrodes measurement setup with glassy carbon working electrode, platinum counter electrode and Ag/Ag+ reference electrode. Two cyclovoltammetric measurements (CVs) are conducted with 5 cycles each and at a scan speed of 10 mV/s. CV1 starts at 0 V versus the reference in negative polarisation direction at a scan speed of 10 mV/s. A final potential of −2500 mV vs. Ag/Ag+ is chosen. CV2 starts at 0 V versus the reference in positive polarisation direction at a scan speed of 10 mV/s. A final potential of +2500 mV vs. Ag/Ag+ is chosen. FIG. 3 shows in each case the first branch of the third cycle. The following electrolytes are used: 1 M TEABF$_4$ in acetonitrile (reference), and an electrolyte system according to the invention (composition according to Table 3, Group c). While no significant differences between reference and electrolyte system of the invention are shown in positive (anodic) direction, the electrolyte system of the invention shows considerable higher electrochemical stability in negative (cathodic) direction.

Example 3

Comparison of Inner Loss Resistance ESR

Figure 4:
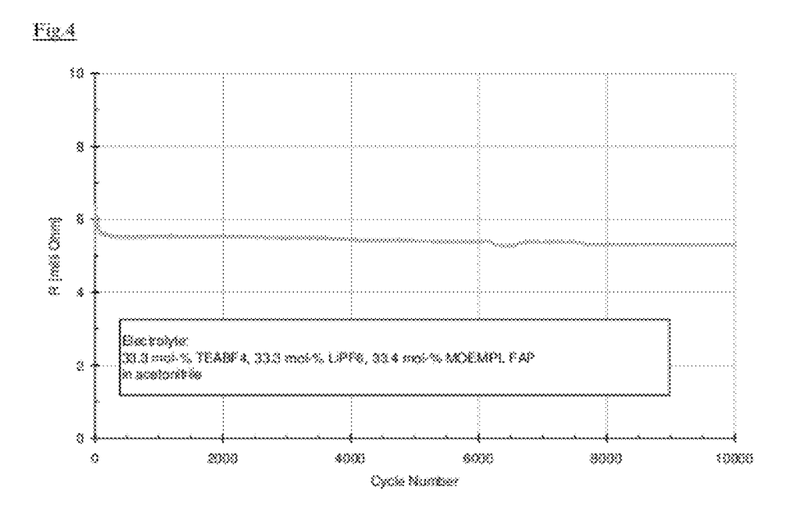
FIG. 4 shows the progression of the inner loss resistance ESR (Equivalent Series Resistance $R_{ESR}$) of a commercial double layer capacitor using an electrolyte according to the invention.

FIG. 4 shows the progression of the inner loss resistance ESR (Equivalent Series Resistance $R_{ESR}$) of a commercial double layer capacitors with a rated capacity of 110 F. A 1M solution of an electrolyte system of the invention (Table 3, Group e) in acetonitrile is used as electrolyte. End of charge potential is 2.7 V. Compared to the reference system (example 1c) the ESR is significantly lower. This is especially striking because the conductivity of the electrolyte system of the invention is 40.2 mS/cm, which is significantly lower than 55.4 mS/cm of the reference electrolyte.

Example 4

Energy Density at Increasing Charging Voltage

Figure 5:
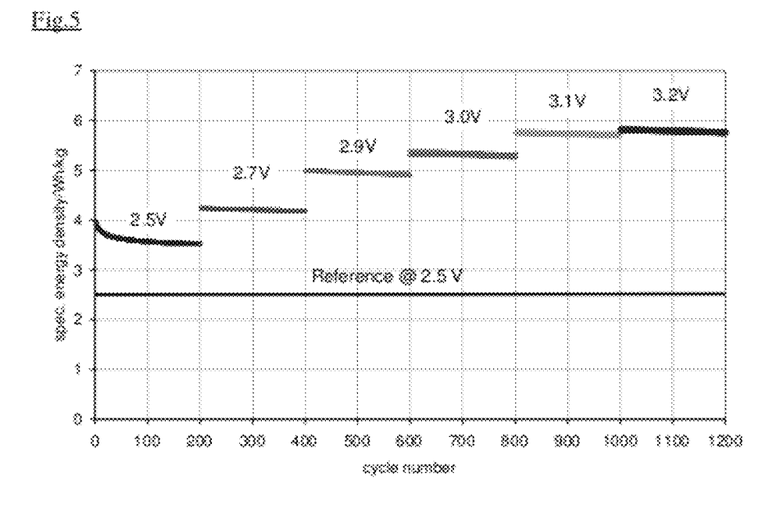
FIG. 5 shows energy density at increasing charging voltage using an electrolyte according to the invention.

An electrolyte system of the invention is tested in a commercial 110 F capacitor with regard to achievable energy density. For this purpose, a commercial 110 F capacitor is filled with an electrolyte system of the invention (composition: Table 3, Group h) and cycled. Charging voltage is continuously increased every 1000 cycles from 2.5 V, 2.7 V, 2.9 V, 3.0 V, 3.1 V up to 3.2 V. While at a charging voltage of 2.5 V, the reference electrolyte reaches a specific energy density of 2.5 Wh/kg, the electrolyte system of the invention already shows an energy density of 3.8 Wh/kg at this charging voltage of 2.5 V. Even at a charging voltage of 3.2 V, the capacitor according to the invention does not break down. The energy density measured at this test condition is 5.8 Wh/kg. FIG. 5 shows these results in form of a diagram.

Example 5

Long Time Cycle Tests of 110 F Double Layer Capacitor

Figure 6:
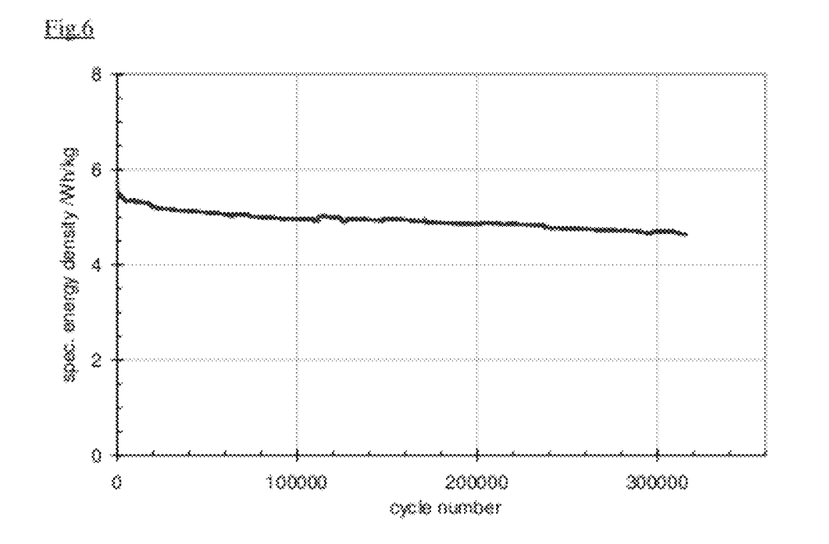
FIG. 6 shows long time cycle tests of 110 F double layer capacitors using an electrolyte according to the invention.

A commercial 110 F capacitor is filled with an electrolyte system of the invention (composition: 0.2 mol-% $(N(C_2H_5)_4$ $BF_4$, 0.75 mol-% MOEMPL FAP, 0.05 mol-% $P_3HT$ FAP in acetonitrile) and cycled for several 100,000 cycles 3.0 V. Even after more than 300,000 cycles energy density does not break down. FIG. 6 shows these results in form of a diagram.

What is claimed is:

1. A hybrid capacitor comprising an electrolyte system wherein the electrolyte system comprises exactly three or four conductive salts:
    wherein each conductive salt has different anionic and cationic radii from each other conductive salt,
    wherein at least one of the conductive salts is of Group III below having an anion with a radius of >0.4 nm and a cation with a radius of >0.3 nm, and
    wherein at least two of the conductive salts are different from the conductive salt of Group III having an anion with a radius of >0.4 nm and a cation with a radius of >0.3 nm and are selected from Groups I-III below,
wherein
    Group I comprises conductive salts having an anion with a radius of <0.4 nm and a cation with a radius of <0.1 nm,
    Group II comprises conductive salts having an anion with a radius of <0.4 nm and a cation that is $[NR_3R_4R_5R_6]^+$, $[PR_3R_4R_5R_6]^+$, with $R_3$-$R_6$ are independently of one another $CH_3$ or $C_2H_5$, and wherein single $CH_2$-groups of the aliphatic rings may be substituted by O, S or $NR_7$ with $R_7$=alkyl, and
    Group III comprises conductive salts having an anion selected from $[(C_2F_5)_3PF_3]^-$ or $[N(SO_2C_2F_5)_2]^-$, and a cation that is $[NR_{10}R_{11}R_{12}R_{13}]^+$, $[PR_{10}R_{11}R_{12}R_{13}]^+$, wherein $R_{10}$-$R_{13}$ are independently of one another an alkyl group with at least 2 carbon atoms, and wherein single $CH_2$-groups of $R_{10}$-$R_{13}$ are substituted by heteroatoms.

2. An electro-optical cell containing an electrolyte system wherein the electrolyte system comprises exactly three or four conductive salts:
    wherein each conductive salt has different anionic and cationic radii from each other conductive salt,
    wherein at least one of the conductive salts is of Group III below having an anion with a radius of >0.4 nm and a cation with a radius of >0.3 nm, and
    wherein at least two of the conductive salts are different from the conductive salt of Group III having an anion with a radius of >0.4 nm and a cation with a radius of >0.3 nm and are selected from Groups I-III below,
wherein
    Group I comprises conductive salts having an anion with a radius of <0.4 nm and a cation with a radius of <0.1 nm,
    Group II comprises conductive salts having an anion with a radius of <0.4 nm and a cation that is $[NR_3R_4R_5R_6]^+$, $[PR_3R_4R_5R_6]^+$, with $R_3$-$R_6$ are independently of one another $CH_3$ or $C_2H_5$, and wherein single $CH_2$-groups of the aliphatic rings may be substituted by O, S or $NR_7$ with $R_7$=alkyl, and
    Group III comprises conductive salts having an anion selected from $[(C_2F_5)_3PF_3]^+$ or $[N(SO_2C_2F_5)_2]^-$, and a cation that is $[NR_{10}R_{11}R_{12}R_{13}]^+$, $[PR_{10}R_{11}R_{12}R_{13}]^+$, wherein $R_{10}$-$R_{13}$ are independently of one another an alkyl group with at least 2 carbon atoms, and wherein single $CH_2$-groups of $R_{10}$-$R_{13}$ are substituted by heteroatoms.

3. An electrolyte system comprising exactly four conductive salts:
    wherein each conductive salt has different anionic and cationic radii from each other conductive salt,
    wherein at least one of the conductive salts is of Group III having an anion with a radius of >0.4 nm and a cation with a radius of >0.3 nm, and
    wherein at least two of the conductive salts are different from the conductive salt of Group III having an anion with a radius of >0.4 nm and a cation with a radius of >0.3 nm and are selected from Groups I-III,
    wherein one conductive salt is of the formula and
wherein
Group I comprises conductive salts having an anion with a radius of <0.4 nm and a cation with a radius of <0.1 nm,
Group II comprises conductive salts having an anion with a radius of <0.4 nm and a cation that is $[NR_3R_4R_5R_6]^+$, $[PR_3R_4R_5R_6]^+$, with $R_3$-$R_6$ are independently of one another $CH_3$ or $C_2H_5$, and wherein single $CH_2$-groups of the aliphatic rings may be substituted by O, S or $NR_7$ with $R_7$=alkyl, and Group III comprises conductive salts having an anion selected from $[(C_2F_5)_3PF_3]^-$ or $[N(SO_2C_2F_5)_2]^-$, and a cation that is $[NR_{10}R_{11}R_{12}R_{13}]^+$, $[PR_{10}R_{11}R_{12}R_{13}]^+$, wherein $R_{10}$-$R_{13}$ are independently of one another an alkyl group with at least 2 carbon atoms, and wherein single $CH_2$-groups of $R_{10}$-$R_{13}$ are substituted by heteroatoms.

* * * * *

UNITED STATES PATENT AND TRADEMARK OFFICE
CERTIFICATE OF CORRECTION

PATENT NO. : 8,920,669 B2
APPLICATION NO. : 13/388454
DATED : December 30, 2014
INVENTOR(S) : Schmidt et al.

It is certified that error appears in the above-identified patent and that said Letters Patent is hereby corrected as shown below:

In the Claims

Column 7, lines 61-65 read

" should read

--

Column 8, lines 40-45 read

" should read

--

Signed and Sealed this
Eleventh Day of August, 2015

Michelle K. Lee
*Director of the United States Patent and Trademark Office*

CERTIFICATE OF CORRECTION (continued)
U.S. Pat. No. 8,920,669 B2

Column 10, lines 6-12 read

"

should read

--